United States Patent
Klein et al.

(10) Patent No.: US 7,647,723 B2
(45) Date of Patent: Jan. 19, 2010

(54) TERMITE-MONITORING DEVICE AND ASSOCIATED METHOD

(75) Inventors: Clark D. Klein, Pittsboro, NC (US); David M. Davies, King of Prussia, PA (US)

(73) Assignee: BASF Aktiengesellschaft, Ludwigshafen (DE)

( * ) Notice: Subject to any disclaimer, the term of this patent is extended or adjusted under 35 U.S.C. 154(b) by 300 days.

(21) Appl. No.: 10/532,164

(22) PCT Filed: Oct. 24, 2003

(86) PCT No.: PCT/EP03/11825
§ 371 (c)(1), (2), (4) Date: Aug. 18, 2005

(87) PCT Pub. No.: WO2004/036990
PCT Pub. Date: May 6, 2004

(65) Prior Publication Data
US 2006/0010765 A1 Jan. 19, 2006

Related U.S. Application Data

(63) Continuation of application No. 10/281,087, filed on Oct. 25, 2002, now abandoned.

(51) Int. Cl.
*A01M 17/00* (2006.01)
*A01M 1/02* (2006.01)
*A01M 1/20* (2006.01)

(52) U.S. Cl. ...................... 43/132.1; 43/131
(58) Field of Classification Search ............... 43/132.1, 43/131, 124
See application file for complete search history.

(56) References Cited

U.S. PATENT DOCUMENTS

| 1,056,535 | A | * | 3/1913 | Grimes et al. | 43/131 |
| 3,564,750 | A | * | 2/1971 | Burgess | 43/132.1 |
| 4,035,946 | A | * | 7/1977 | Rapp et al. | 43/131 |

(Continued)

FOREIGN PATENT DOCUMENTS

JP 63 127380 8/1988

(Continued)

OTHER PUBLICATIONS

Office Action issued in Japanese Patent Application No. 2004-545979 mailed Nov. 13, 2007.

*Primary Examiner*—Darren W Ark
(74) *Attorney, Agent, or Firm*—Brinks Hofer Gilson & Lione

(57) ABSTRACT

A camouflaged termite-monitoring device is provided. Such a device comprises a housing (100) which defines a cavity (300) and an opening (400). A perforated bait cartridge (475) is disposed within the cavity and contains a bait material (450) adapted to be attractive to termites. A mesh-like member (500) is operably engaged with the housing so as to cover the opening and to retain the bait cartridge in the cavity. The mesh-like member is further adapted to allow termites to pass therethrough into the cavity and the bait cartridge and to infiltrate the housing. An inspection hatch (550) is operably engaged with the housing and is configured to allow visual inspection of the bait cartridge within the cavity from outside the housing. Such a visual inspection is performed without removing the housing from engagement with the upper ground surface. An associated method is also provided.

10 Claims, 4 Drawing Sheets

U.S. PATENT DOCUMENTS

| | | | | |
|---|---|---|---|---|
| 4,194,690 | A * | 3/1980 | Stever et al. | 43/131 |
| 4,277,907 | A * | 7/1981 | Ernest | 43/131 |
| 5,099,598 | A * | 3/1992 | Carter | 43/132.1 |
| 5,172,514 | A * | 12/1992 | Weber et al. | 43/132.1 |
| 5,329,726 | A * | 7/1994 | Thorne et al. | 43/131 |
| 5,555,672 | A * | 9/1996 | Thorne et al. | 43/131 |
| 5,778,596 | A * | 7/1998 | Henderson et al. | 43/132.1 |
| 5,832,658 | A * | 11/1998 | Randon | 43/132.1 |
| 5,899,018 | A * | 5/1999 | Gordon et al. | 43/132.1 |
| 5,901,496 | A * | 5/1999 | Woodruff | 43/131 |
| 5,921,018 | A * | 7/1999 | Hirose et al. | 43/132.1 |
| 5,927,001 | A * | 7/1999 | Ballard et al. | 43/132.1 |
| 5,937,571 | A * | 8/1999 | Megargle et al. | 43/132.1 |
| 5,950,356 | A * | 9/1999 | Nimocks | 43/132.1 |
| 5,953,855 | A * | 9/1999 | Edwards | 43/132.1 |
| 6,016,625 | A * | 1/2000 | Bishoff et al. | 43/132.1 |
| 6,058,646 | A * | 5/2000 | Bishoff et al. | 43/132.1 |
| 6,065,241 | A * | 5/2000 | Woodruff | 43/132.1 |
| 6,079,151 | A * | 6/2000 | Bishoff et al. | 43/132.1 |
| 6,082,042 | A * | 7/2000 | Issitt | 43/131 |
| 6,145,242 | A * | 11/2000 | Simpson | 43/131 |
| 6,158,166 | A * | 12/2000 | Snell et al. | 43/132.1 |
| 6,178,834 | B1 * | 1/2001 | Cates | 43/132.1 |
| 6,187,328 | B1 * | 2/2001 | Ballard et al. | 43/131 |
| 6,189,393 | B1 * | 2/2001 | Cates | 73/865.8 |
| 6,195,934 | B1 * | 3/2001 | Megargle et al. | 43/132.1 |
| 6,202,342 | B1 * | 3/2001 | Edwards | 43/132.1 |
| 6,205,701 | B1 * | 3/2001 | Nimocks, III | 43/132.1 |
| 6,219,961 | B1 * | 4/2001 | Ballard et al. | 43/131 |
| 6,266,918 | B1 * | 7/2001 | Henderson et al. | 43/132.1 |
| 6,370,811 | B1 * | 4/2002 | Masterson | 43/132.1 |
| 6,370,812 | B1 * | 4/2002 | Burns et al. | 43/132.1 |
| 6,389,741 | B2 * | 5/2002 | Nimocks, III | 43/132.1 |
| 6,397,516 | B1 * | 6/2002 | Su | 43/132.1 |
| 6,543,182 | B2 * | 4/2003 | Snell et al. | 43/132.1 |
| 6,612,068 | B1 * | 9/2003 | Aesch, Jr. | 43/132.1 |
| 6,651,378 | B2 * | 11/2003 | Baker | 43/131 |
| 6,655,079 | B1 * | 12/2003 | Bernard et al. | 43/132.1 |
| 6,729,067 | B2 * | 5/2004 | Lund et al. | 43/132.1 |
| 6,807,768 | B2 * | 10/2004 | Johnson et al. | 43/131 |
| 6,834,611 | B2 * | 12/2004 | Berthold et al. | 43/132.1 |
| 6,874,274 | B2 * | 4/2005 | Townsend | 43/131 |
| 6,928,771 | B1 * | 8/2005 | Tesh | 43/132.1 |
| 7,051,474 | B1 * | 5/2006 | Tesh | 43/132.1 |
| 7,086,196 | B2 * | 8/2006 | Cink et al. | 43/132.1 |
| RE40,884 | E * | 9/2009 | Masterson | 43/132.1 |
| 2002/0023382 | A1 * | 2/2002 | Snell et al. | 43/132.1 |
| 2002/0043018 | A1 * | 4/2002 | Townsend | 43/131 |
| 2002/0108295 | A1 * | 8/2002 | Aesch et al. | 43/132.1 |
| 2002/0116866 | A1 * | 8/2002 | Aesch et al. | 43/132.1 |
| 2002/0134004 | A1 * | 9/2002 | Gordon | 43/132.1 |
| 2002/0144453 | A1 * | 10/2002 | Su | 43/124 |
| 2002/0148157 | A1 * | 10/2002 | Rollins | 43/132.1 |
| 2003/0124166 | A1 * | 7/2003 | Brode et al. | 424/410 |
| 2003/0200695 | A1 * | 10/2003 | Tesh | 43/124 |
| 2004/0031190 | A1 * | 2/2004 | Collins et al. | 43/132.1 |
| 2004/0187378 | A1 * | 9/2004 | Cink et al. | 43/132.1 |
| 2004/0200134 | A1 * | 10/2004 | Cink et al. | 43/132.1 |
| 2004/0231230 | A1 * | 11/2004 | Wright | 43/132.1 |
| 2006/0117645 | A1 * | 6/2006 | Cink et al. | 43/132.1 |
| 2006/0162236 | A1 * | 7/2006 | French | 43/132.1 |
| 2009/0000181 | A1 * | 1/2009 | Cink | 43/132.1 |
| 2009/0000182 | A1 * | 1/2009 | Cink | 43/132.1 |
| 2009/0084022 | A1 * | 4/2009 | Cink et al. | 43/124 |
| 2009/0094884 | A1 * | 4/2009 | Cink | 43/132.1 |

FOREIGN PATENT DOCUMENTS

| | | |
|---|---|---|
| JP | 63 129471 | 8/1988 |
| JP | 09224540 A * | 9/1997 |
| JP | 10004850 A * | 1/1998 |
| JP | 11103746 A * | 4/1999 |
| JP | 11127753 A * | 5/1999 |
| JP | 30 69278 | 3/2000 |
| JP | 2000 509982 | 8/2000 |
| JP | 2000209999 A * | 8/2000 |
| JP | 2001 502914 | 3/2001 |
| JP | 2003137705 A * | 5/2003 |
| WO | WO 9323998 A1 * | 12/1993 |
| WO | WO 96/04986 | 2/1996 |
| WO | WO-96/32009 | 10/1996 |
| WO | WO 97/40667 | 11/1997 |
| WO | WO 98/18319 | 5/1998 |
| WO | WO 03 20022 A1 * | 3/2003 |
| WO | WO 2004016085 A1 * | 2/2004 |
| WO | WO 2007051873 A1 * | 5/2007 |

* cited by examiner

TERMITE-MONITORING DEVICE AND ASSOCIATED METHOD

This application is the National Stage of International Application No. PCT/EP2003/011825, filed Oct. 24, 2003, which claims the benefit of, and is a continuation of, U.S. application Ser. No. 10/281,087, filed Oct. 25, 2002 now abandoned; the contents of these applications are hereby incorporated by reference herein in their entirety.

BACKGROUND OF THE INVENTION

1. Field of the Invention

The present invention relates to a device and method for detecting termites and, more particularly, to a termite-monitoring device and associated method.

2. Description of Related Art

Subterranean termites are major insect pests and a bane to homeowners throughout the country. A significant amount of money is spent annually by homeowners to repair termite damage and/or to obtain the necessary termite control treatments. In many instances, the homeowners are not aware of catastrophic termite infestations, or even the presence of termites, until major damage becomes evident or the damage is found in a home inspection by a home inspector or pest control professional. However, such inspections are generally only performed annually by pest control professionals, and usually only if the homeowner has entered a termite protection contract. Termites, on the other hand, may infest a home at any time and an infestation may cause significant damage to wooden structures on the premises in a very short period of time. Thus, even with a termite protection contract, a home may suffer significant damage if a termite infestation is not immediately detected and eradicated.

There exist some products that are configured to be implanted into the ground around the premises and contain a bait having an active ingredient that is toxic to termites. However, such products do not readily permit the homeowner to determine if termites are even present on the premises. For example, such products must often be removed from the ground in order for the homeowner to determine if the bait has been consumed. In addition, the product may be covered with mud or otherwise affected by moisture in the ground, which may make it difficult for an untrained homeowner to see the bait, much less determine if the bait has been consumed by termites. Further, in some instances, the products may be easily covered by debris such as leaves or soil, whereby the products may readily become forgotten or overlooked by the homeowner if the homeowner is not diligent about regular monitoring of the products. On the other hand, if the products are made to be readily located by the homeowner, such products may often undesirably stand out in a common residential landscape or be otherwise unsightly on the premises.

Thus, there exists a need for an unobtrusive termite monitoring device for allowing expedient detection, by the homeowner, of the presence of termites on the property, which would thereby permit the homeowner to contact a pest control professional to inspect and treat the premises with an appropriate insecticide to eradicate the termites and prevent damage, or further damage, to wooden structures on the premises.

BRIEF SUMMARY OF THE INVENTION

The above and other needs are met by the present invention which, in one embodiment, provides a camouflaged termite-monitoring device. Such a device comprises a housing configured as a landscape element and adapted to engage an upper ground surface, wherein the housing defines a cavity and an opening to the cavity through a ground-contacting surface of the housing. A perforated bait cartridge is configured to fit within the cavity and contains a bait material adapted to be attractive to termites. A mesh-like member is operably engaged with the housing about the ground-contacting portion so as to cover the opening and to retain the bait cartridge in the cavity. The mesh-like member is further adapted to allow termites attracted by the bait material to pass therethrough into the cavity and the bait cartridge and to infiltrate the housing. An inspection hatch is operably engaged with the housing and is configured to allow visual inspection of the bait cartridge from outside the housing. Such a visual inspection will reveal whether termites have infiltrated the housing and consumed the bait material, and is performed without removing the housing from engagement with the upper ground surface.

Another advantageous aspect of the present invention comprises a method of monitoring for termites at a site. First, a housing configured as a landscape element is engaged with an upper ground surface without implanting the housing in the ground, wherein the housing defines a cavity and an opening to the cavity through a ground-contacting surface of the housing. The cavity has a perforated bait cartridge disposed therein, wherein the bait cartridge contains a bait material adapted to be attractive to termites. The housing has a mesh-like member operably engaged therewith about the ground-contacting surface so as to cover the opening and to retain the bait cartridge in the cavity. The mesh-like member is further adapted to allow termites attracted by the bait material to pass therethrough into the cavity and the bait cartridge and to infiltrate the housing. The bait cartridge is then inspected to determine whether termites have infiltrated the housing and have consumed the bait material, without removing the housing from engagement with the ground, wherein at least one of the bait cartridge, the cavity, and the mesh-like member are configured so as to become increasingly prominently visible through the inspection hatch as the bait material is consumed.

Thus, embodiments of the present invention meet the above-identified needs and provide distinct advantages as further detailed herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
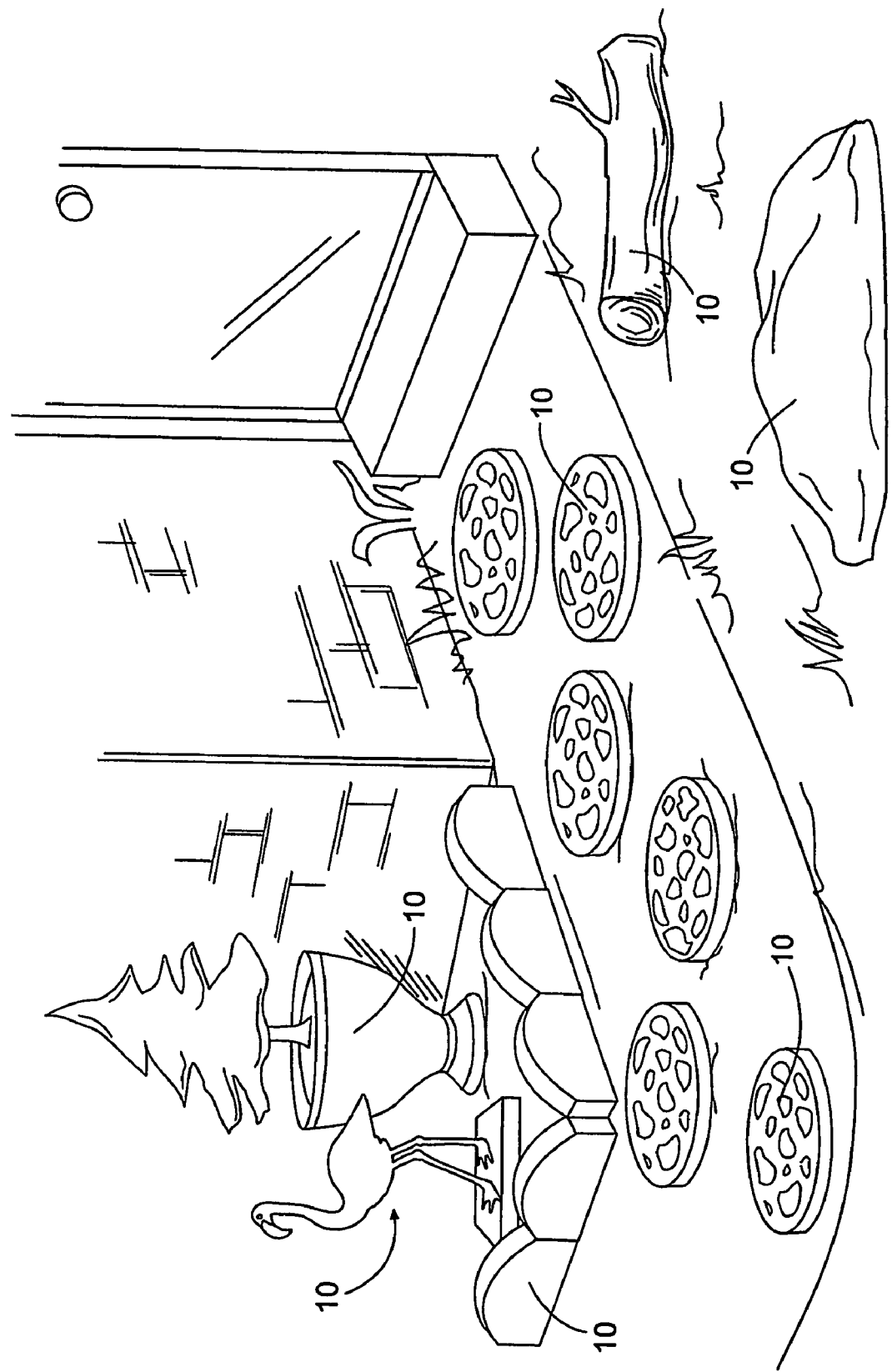
FIG. 1 is a schematic illustration of a residential landscape illustrating several termite monitoring devices according to embodiments of the present invention.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIGS. 1-4 schematically illustrate a termite monitoring device according to one embodiment of the present invention, the device being indicated generally by the numeral 10. Such a device 10 comprises a housing 100 extending from a ground-contacting surface 200 and defining a cavity 300 therein. The ground-contacting surface 200 further defines an opening 400 for providing access to the cavity 300. A bait material 450 is disposed within a bait cartridge 475 which, in turn, is capable of being disposed within the cavity 300. The bait cartridge 475 is secured and retained within the cavity 300 by a mesh-like member 500 operably engaged with the housing 100 and covering the opening 400. An inspection hatch 550 is operably engaged with the housing 100 so as to permit a visual inspection of the bait cartridge 475 from outside the housing 100, without removing the housing 100 from engagement with the upper surface 5 of the ground.

The housing 100 may be configured in a variety of shapes and formed of a variety of materials. In some particularly advantageous embodiments of the present invention, the housing 100 is configured as a landscape element, wherein such an element is preferably unobtrusive or otherwise natural in a residential setting and thus camouflaged with respect to items commonly found in a residential yard. For example, as shown in FIG. 1, the housing 100 may be configured as a rock, a log, a paving or stepping stone, a brick, a border element for a flowerbed or the like, a decorative figurine, or any other item capable of incorporating the various aspects of the present invention as described herein. Moreover, such a housing 100 is preferably adapted to be deployed and used at the upper ground surface 5. That is, the housing 100 is preferably configured such that the user is not required to implant the housing 100 in or under the upper ground surface 5, which minimizes the effort required from the user for deploying the device 10. However, one skilled in that art will appreciate that, in some instances, the user may have to prepare the upper ground surface 5 for receiving the device 10, wherein the extent of the preparations may depend on the configuration of the device 10. For instance, where the housing 100 is configured as a stepping stone, a brick, or a border element, the upper ground surface 5 may have to be leveled or otherwise dug out to some extent in order for the housing 100 to be seated level and upright with respect to the upper ground surface 5. Where the housing 100 is configured as a decorative figurine, log, or rock, it may be sufficient to just place the housing 100 in the desired position at a selected spot on the upper ground surface 5.

Figure 2:
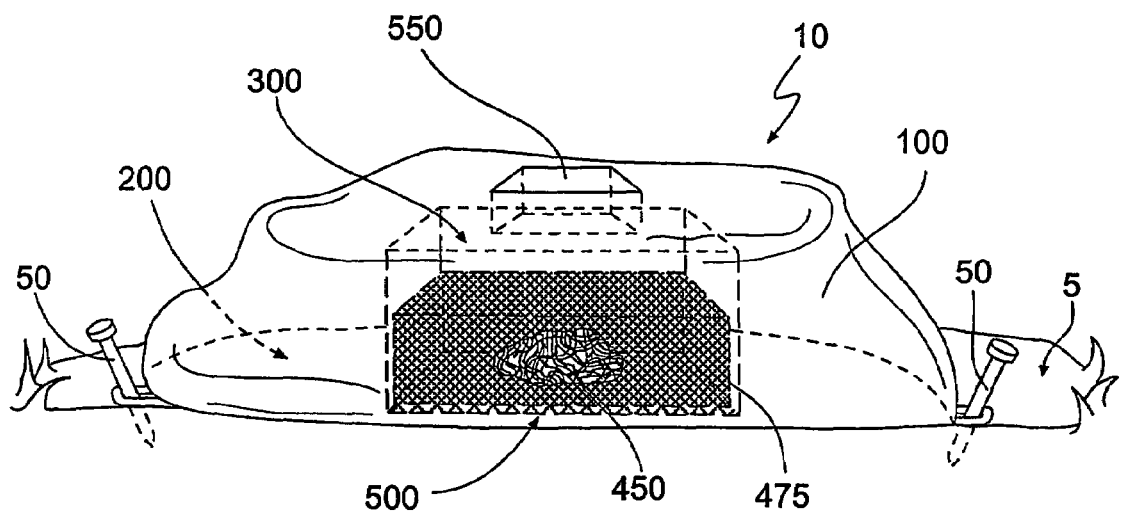
FIG. 2 is a schematic illustration of a termite monitoring device, in engagement with an upper ground surface, according to one embodiment of the present invention.
Figure 3:
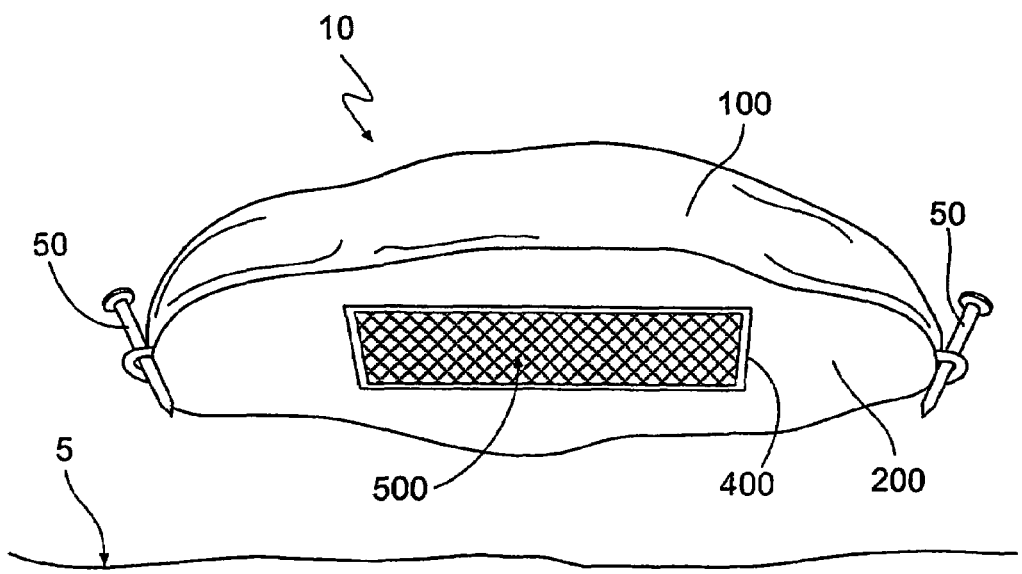
FIG. 3 is a schematic illustration of a termite monitoring device, separated from the upper ground surface, according to one embodiment of the present invention.

In some instances, the device 100 may also be provided, when and if necessary, with an anchor element 50 configured to secure the housing 100 to the ground 5, as shown in FIGS. 2 and 3. The anchor element 50 may be, for example, integral with the housing 100, attached thereto by a bracket (not shown) or a tether (not shown), or otherwise operably engageable with the housing 100.

The ground-contacting surface 200 of the housing 100 comprises a surface of the housing 100 contacting the upper ground surface 5 when the device 10 is deployed in its intended orientation. That is, the ground-contacting surface 200 may be considered the "bottom surface" of the device 10, in many instances. Accordingly, the ground-contacting surface 200 may comprise, for example, the bottom surface of a decorative figurine, a flat surface of a stepping stone, a brick, or a border element, the base of a vase, or the like. The ground-contacting surface 200 further defines an opening 400 into the cavity 300 in the housing 100. The opening 400 is generally sufficient for the bait cartridge 475 to be inserted therethrough into the cavity 300. However, in some instances, the housing 100 may define an additional opening (not shown) or, for example, may be configured to have separate engageable portions which may be disengaged in order to insert the bait cartridge 475 into the cavity 300 and then re-engaged to contain the bait cartridge 475. The bait cartridge 475 may be comprised of, for example, a thin plastic or metal mesh, wherein the mesh may be configured so as to allow termites and other wood-destroying insects to be able to proceed through the mesh into the interior of the bait cartridge 475, while the mesh may also be configured to selectively prohibit other insects from passing therethrough. In some instances, the bait cartridge 475 may be formed in the shape of a rectangle, though other suitable shapes are to be considered within the spirit and scope of the present invention. In some embodiments, the bait material 450 is sealed within the bait cartridge 475, wherein the bait cartridge 475 is intended as a disposable and replaceable unit.

Figure 4:
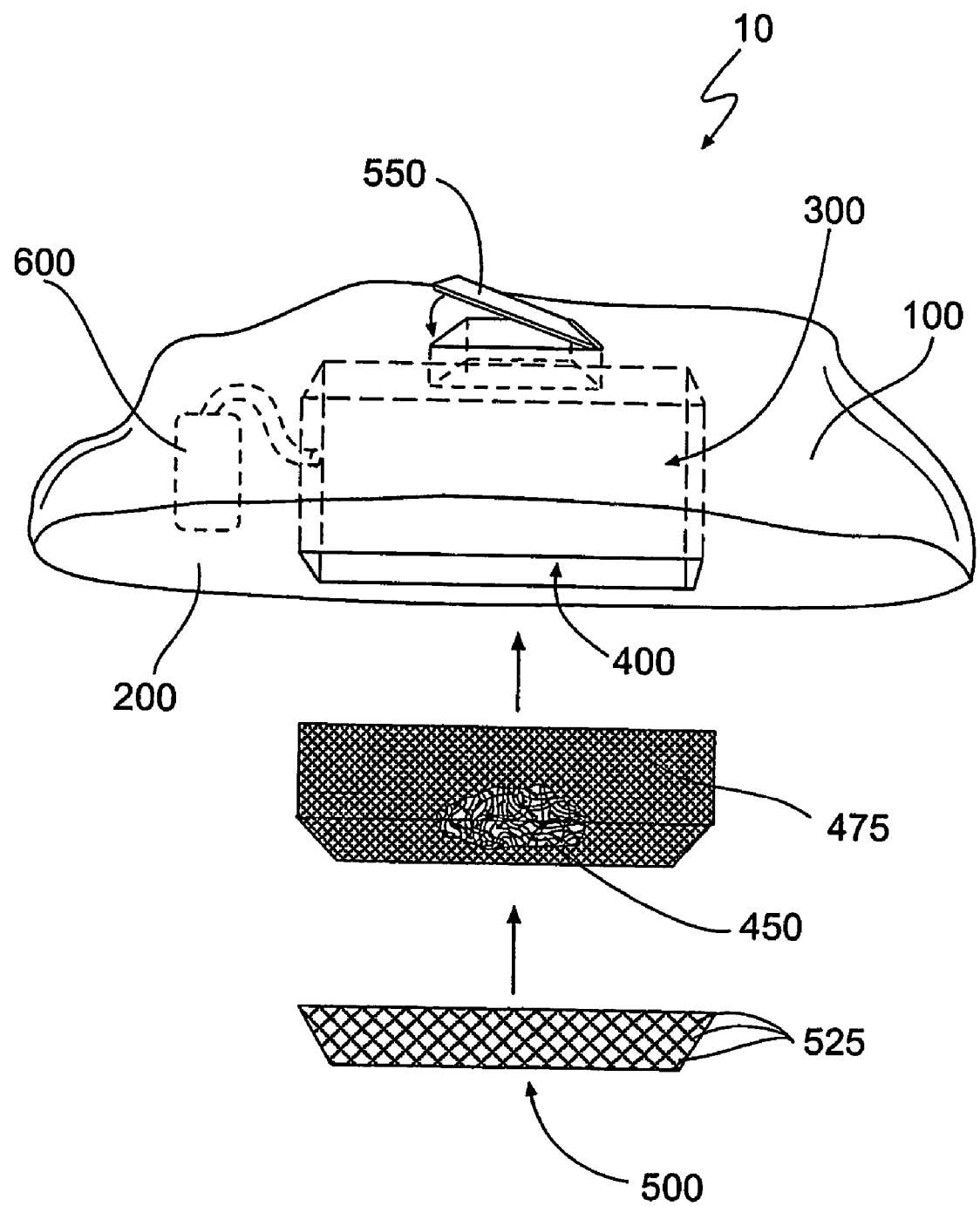
FIG. 4 is a schematic assembly drawing of a termite monitoring device according to one embodiment of the present invention.
Figure 5A:
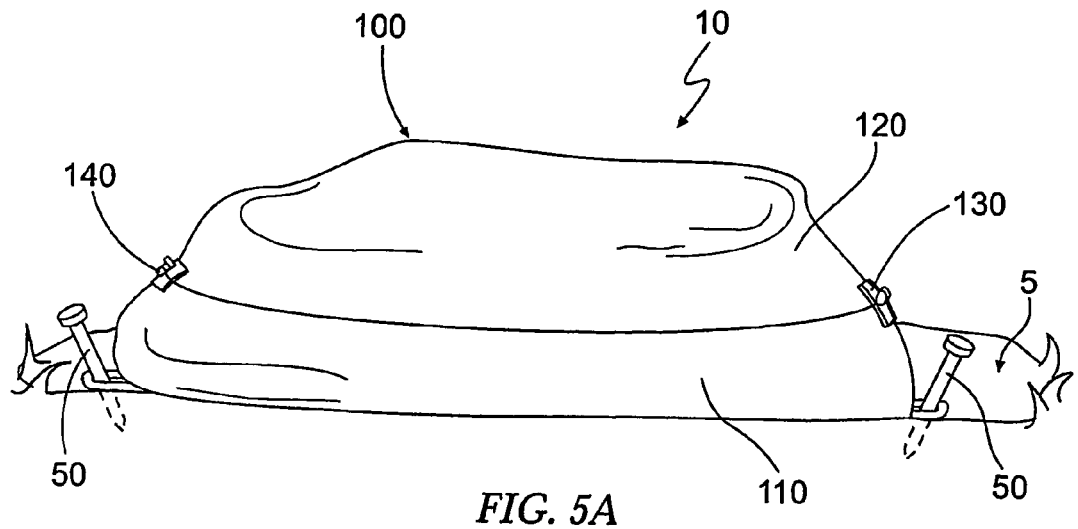
FIGS. 5A and 5B are schematic illustrations of a termite monitoring device according to an alternate embodiment of the present invention.
Figure 5B:
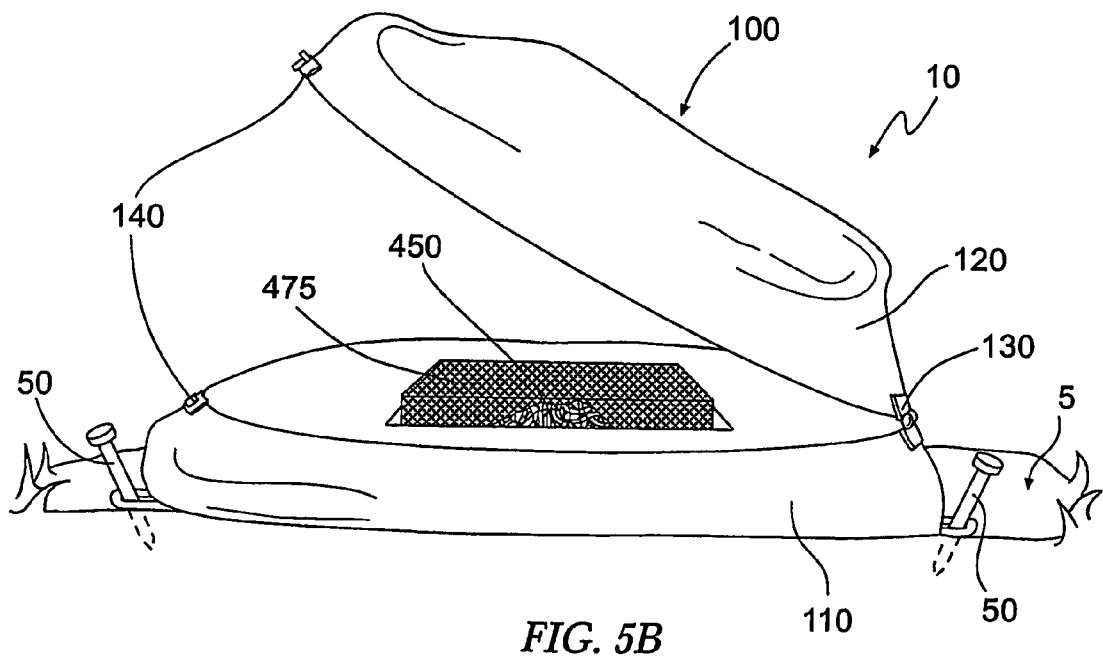

For example, as shown in FIGS. 2 and 4, the housing 100 may further includes an inspection hatch 550 configured with respect to the housing 100 such that the bait cartridge 475 within the cavity 300 may be viewed from outside of the housing 100 through the hatch 550. For example, the hatch 550 may be disposed on an upper surface of the housing 100, generally opposite to the ground-contacting surface 200, such that, when the device 10 is deployed, the user is able to open and look through the hatch 550 without removing the device 10 from the upper ground surface 5. Preferably, the hatch 550 is opaque, or at least semi-opaque, and is comprised of the same material as the housing 100 so as to present an integral appearance, or is configured to appear as an appropriate component of the housing 100. In still other instances, the hatch 550 may also be configured to be, for example, removable, hinged, or otherwise removably engaged with respect to the housing 100 so as to allow access to the cavity 300 from above the upper ground surface 5 without requiring the device 10 to be removed from the upper ground surface 5. In this manner, the hatch 550 may be opened or removed to inspect the bait cartridge 475 within the cavity 300 and/or to replace the bait cartridge 475 within the cavity 300. For example, as shown in FIGS. 5A and 5B, the housing 100 may be configured with a first portion 110 configured to engage the upper ground surface 5 and a second portion 120 operably engaged with the first portion 110, wherein the first and second portions 110, 120 cooperate to define the cavity 300 and the second portion 120 may be regarded as essentially comprising the hatch 550. The first and second portions 110, 120 may be, for example, removable, hinged, or otherwise removably engaged with respect to each other. As shown, one or more hinges 130 may connect the first and second portions 110, 120, while a latch 140 may removably secure the first and Bond portions 110, 120 together opposite the hinge 130. The latch 140 may then simply be undone so as to allow the second portion 120 to be rotated away from the first portion 110 about the hinge 130 and the bait material 450 within the bait cartridge 475 to be inspected.

In one embodiment of the present invention, the bait material 450 is preferably selected so as to be attractive to, for example, termites or other wood-destroying insects. In one advantageous embodiment, the bait material 450 is at least partially comprised of, for example, aspen wood fibers or aspen wood having a fibrous texture. Further, the bait material 450, according to some embodiments of the present invention, is non-toxic to termites and other wood-destroying insects. Accordingly, one advantageous aspect of the present invention is that, when deployed, the device 10 is configured to allow termites or other wood-destroying insects to enter the cavity 300 and the bait cartridge 475 through the mesh-like member 500, wherein consumption of the bait material 450 may then be observed or monitored through the hatch 550 without removing the housing 100 from the upper ground surface 5, or through the mesh-like member 500 if the housing 100 is removed from the upper ground surface 5. Accordingly, if consumption of the bait material 450 is observed, such an observation may be reported to a central station (not shown) comprising the manufacturer of the device 10 or an entity otherwise associated with or authorized by the manufacturer of the device 10. The central station may then, for example, notify or dispatch a pest control professional to the residence or may direct that other pest control procedures may be undertaken before the occurrence of damage to wooden structures on the property. However, in some instances, certain bait cartridges 475 may be available having a bait material 450 with an active ingredient toxic to termites and other wood-destroying insects as will be appreciated by one skilled in the art. Such bait cartridges 475 with a toxic bait material 450 may be provided by the central station or pest control professional or may otherwise be available for replacement in the housing 100 of the bait cartridge 475 having the non-toxic bait material 450. In still other instances, a device 10 according to embodiments of the invention may be initially provided with a bait cartridge containing a toxic bait material 450.

One skilled in the art will further appreciate that the bait cartridge 475 containing the bait material 450 may also be formed, as necessary, to facilitate insertion thereof into the cavity 300 through the opening 400 and/or through the hatch 550. In some instances, the device 10 may be configured to be disposable or replaceable, in that the device 10 may be provided with the bait cartridge 475, or just the bait material 450, already deposited in the cavity 300, wherein neither the mesh-like member 500 nor the hatch 550 can be opened to remove or replace the bait material 450 and/or the bait cartridge 475. As such, in such instances, if and when the bait material 450 is depleted, the device 10 may be discarded, replaced with another, or merely left in place as a landscape element.

The mesh-like member 500, as shown in FIGS. 2-4, is operably engaged with the ground-contacting surface 200 of the housing 100 so as to be in contact or at least in close proximity with the upper ground surface 5 when the device 10 is installed as a landscape element or, in some instances, when the housing 100 is just rested on the upper ground surface 5 in an upright position, as in the case of a decorative figurine. As such, when the device 10 is deployed, the bait material 450 may be in contact with the upper ground surface 5, or otherwise in close proximity thereto, through the bait cartridge 475 and the mesh-like member 500. The mesh-like member 500 may also be hinged, removable, or otherwise removably engaged, with respect to the housing 100, but also configured to cover the opening 400 when in a locked position. The mesh-like member 500 is further configured to define openings 525 therein, with the openings 525 being sized to permit the targeted termites and/or other wood-destroying insects to enter the cavity 300 therethrough. However, according to one aspect of the present invention, the openings 525 and/or the mesh-like member 500 are further configured to exclude other non-targeted insects, which may also be attracted to the bait material 450, from entering the cavity 300 and the bait cartridge 475, consuming the bait material 450, and providing a false indication of the presence of the termites or the other wood-destroying insects.

In some instances, the bait material 450 is more attractive to termites or other wood-destroying insects when wet. Accordingly, according to one advantageous aspect of the present invention, the bait material 450 may also be configured to be self-wicking so as to extract moisture from, for example, the ground or the atmosphere, when the device 10 is deployed. In other instances, as shown in FIG. 4, the device 10 may further include a water reservoir 600 operably engaged with the housing 100 and configured to provide continuous, or at least substantially continuous, wetting of the bait material 450.

According to yet another advantageous aspect of the present invention, the bait cartridge 475, the cavity 300, the mesh-like member 500, or other portions of the housing 100 may be configured to become increasingly prominently visible through the hatch 550 as the bait material 450 becomes consumed by termites or other wood destroying insects. For example, the interior surface of the housing 100 defining the cavity 300 and/or the mesh-like member 500 and/or the bottom surface of the bait cartridge 475 may be, for instance, brightly colored. Initially, when the bait cartridge 475 is first inserted in the cavity 300, the brightly colored cavity surface, bottom surface of the bait cartridge 475, and/or mesh-like member 500 are covered by the bait material 450 and thus are not visible through the window 550. However, as the bait material 450 becomes consumed, increasingly more of the cavity surface, bottom surface of the bait cartridge 475, and/or the mesh-like member 500 will become more prominently visible. As such, the user will be able to readily determine, at a glance, if the bright color of the cavity surface, bottom surface of the bait cartridge 475, and/or mesh-like member 500 are visible, thereby indicating the presence of termites and/or other wood-destroying insects in the vicinity. One skilled in the art will appreciate, however, that the same function may be accomplished in other manners. For example, the bait material 450 itself may be brightly colored, while the cavity surface, bottom surface of the bait cartridge 475, and/or the mesh-like member 500 may be colored as the remainder of the housing 100 or in a contrasting color to the bait material 450. As such, the absence of the bright color of the bait material 450 will also indicate whether termites and/or other wood destroying insects are present in the cavity 300.

Many modifications and other embodiments of the invention set forth herein will come to mind to one skilled in the art to which this invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A camouflaged termite monitoring device, comprising:
a housing configured as a landscape element and having a bottom surface adapted to engage an upper ground surface, the housing defining a cavity and an opening to the cavity through the bottom surface of the housing;
a perforated bait cartridge configured to fit within the cavity;
a bait material disposed within the bait cartridge and adapted to be attractive to termites;

a mesh-like member operably engaged with the housing on the bottom surface so as to cover the opening to the cavity and to retain the bait cartridge in the cavity, the mesh-like member having a longitudinal axis which is substantially parallel with the bottom surface and defining openings therein, with the openings being sized to permit termites attracted by the bait material to pass therethrough into the cavity and the bait cartridge and to infiltrate the housing; and an inspection hatch disposed on an upper surface of the housing, generally opposite the bottom surface, the inspection hatch being operably engaged with the housing and configured to allow visual inspection of the bait cartridge within the cavity from outside the housing when the inspection hatch is in an open position, so as to determine whether termites have infiltrated the housing and consumed the bait material in the bait cartridge, without removing the housing from engagement with the upper ground surface, and the inspection hatch extending in a plane which is substantially parallel with the bottom surface when the inspection hatch is in a closed position.

2. A device according to claim 1 wherein the inspection hatch is configured to be opaque.

3. A device according to claim 1 wherein at least one of the bait cartridge, the cavity, and the mesh-like member are configured so as to become increasingly prominently visible through the inspection hatch as the bait material is consumed.

4. A device according to claim 1 further comprising an anchor member operably engaged with the housing, the anchor member being adapted to secure the housing in engagement with the upper ground surface.

5. A device according to claim 1 wherein the housing, the mesh-like member, the bait cartridge, and the bait material are configured to cooperate to allow the bait material to contact the upper ground surface when the housing is in engagement with the upper ground surface.

6. A device according to claim 1 wherein the bait material is configured to be self-wicking.

7. A device according to claim 1 further comprising a water reservoir disposed within the housing in operable engagement with the bait material and configured so as to provide substantially continuous wetting of the bait material.

8. A device according to claim 1 wherein the housing further comprises a first portion, the first portion including the bottom surface and being adapted to engage the upper ground surface, and a second portion cooperating with the first portion to define the cavity, the second portion being separably engaged with the first portion, and the second portion including the upper surface and comprising the inspection hatch.

9. A device according to claim 8 wherein the second portion is connected to the first portion by a hinge.

10. The device of claim 1, wherein the housing is configured as the landscape element selected from the group consisting of a rock, log, a paving or stepping stone, a brick, a border element, and a decorative figurine.

* * * * *

UNITED STATES PATENT AND TRADEMARK OFFICE
CERTIFICATE OF CORRECTION

PATENT NO. : 7,647,723 B2  
APPLICATION NO. : 10/532164  
DATED : January 19, 2010  
INVENTOR(S) : Klein et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 634 days.

Signed and Sealed this

Sixteenth Day of November, 2010

David J. Kappos  
*Director of the United States Patent and Trademark Office*